United States Patent [19]

Ormiston

[11] Patent Number: 5,755,068

[45] Date of Patent: May 26, 1998

[54] VENEER PANELS AND METHOD OF MAKING

[76] Inventor: Fred L. Ormiston, 5446 First St., Houston, Tex. 77493

[21] Appl. No.: 720,386

[22] Filed: Sep. 27, 1996

Related U.S. Application Data

[63] Continuation of Ser. No. 559,829, Nov. 17, 1995, abandoned.

[51] Int. Cl.$^6$ ............................... B44F 9/02; E04C 1/40
[52] U.S. Cl. .................... 52/314; 52/313; 52/589.1; 52/309.13; 428/48; 428/167
[58] Field of Search ............................ 428/47, 48, 167

[56] References Cited

U.S. PATENT DOCUMENTS

| | | |
|---|---|---|
| 906,654 | 12/1908 | Papin . |
| 1,532,504 | 4/1925 | Uchtenfeld ........................ 52/313 X |
| 2,063,935 | 12/1936 | Kirschbraun . |
| 2,209,283 | 7/1940 | Ronzone . |
| 3,426,490 | 2/1969 | Taylor . |
| 3,496,694 | 2/1970 | Hicks et al. . |
| 4,001,361 | 1/1977 | Unruh . |
| 4,016,692 | 4/1977 | Jordan et al. ........................ 52/314 |
| 4,164,598 | 8/1979 | Wilhelm .......................... 52/314 X |
| 4,241,554 | 12/1980 | Infantino ............................ 52/314 |
| 4,275,540 | 6/1981 | Keller . |
| 4,299,069 | 11/1981 | Neumann . |
| 4,407,104 | 10/1983 | Francis . |
| 4,644,719 | 2/1987 | Salazar .......................... 52/314 X |
| 5,052,160 | 10/1991 | Gentsch et al. .................... 52/314 |
| 5,113,632 | 5/1992 | Hanson ............................. 52/385 |

FOREIGN PATENT DOCUMENTS 3919514   12/1990   Germany .......................... 52/313

*Primary Examiner*—Michael Safavi
*Assistant Examiner*—Yvonne Horton-Richardson
*Attorney, Agent, or Firm*—Bush, Riddle & Jackson

[57] ABSTRACT

A veneer panel (10) has a relatively thin veneer layer (12) secured to a relatively thick supporting base (16) to form a generally rectangular veneer panel blank. The outer veneer layer (12) is then grooved in a predetermined pattern with longitudinally extending grooves (30) and transversely extending grooves (34) in the veneer layer forming veneer rows (30). At least one end of the veneer panel (10) is cut across its entire thickness to form projecting end portions (32B) of varying lengths corresponding to the veneer rows (30) and defining slotted spaces (36) between the projecting end portions (32B). A complementary projecting end portion (32B) of an adjacent panel is provided and the end portions (32B) on complementary panels are interfitted to form a staggered joint defined by a plurality of transverse grooves across the entire width of the panels similar to the remaining grooves (30, 34).

18 Claims, 4 Drawing Sheets

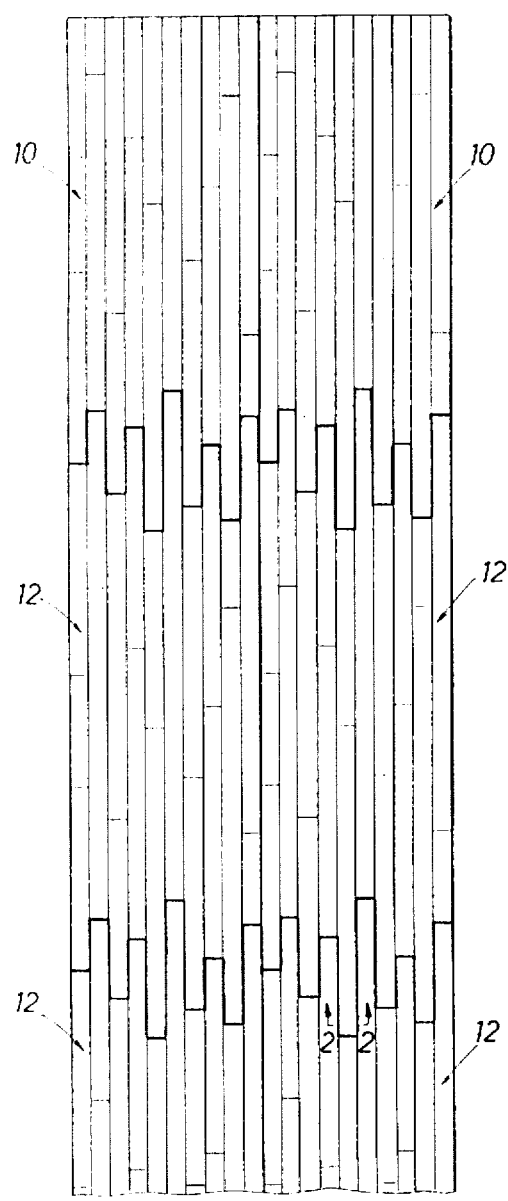
FIG.1
FIG.2
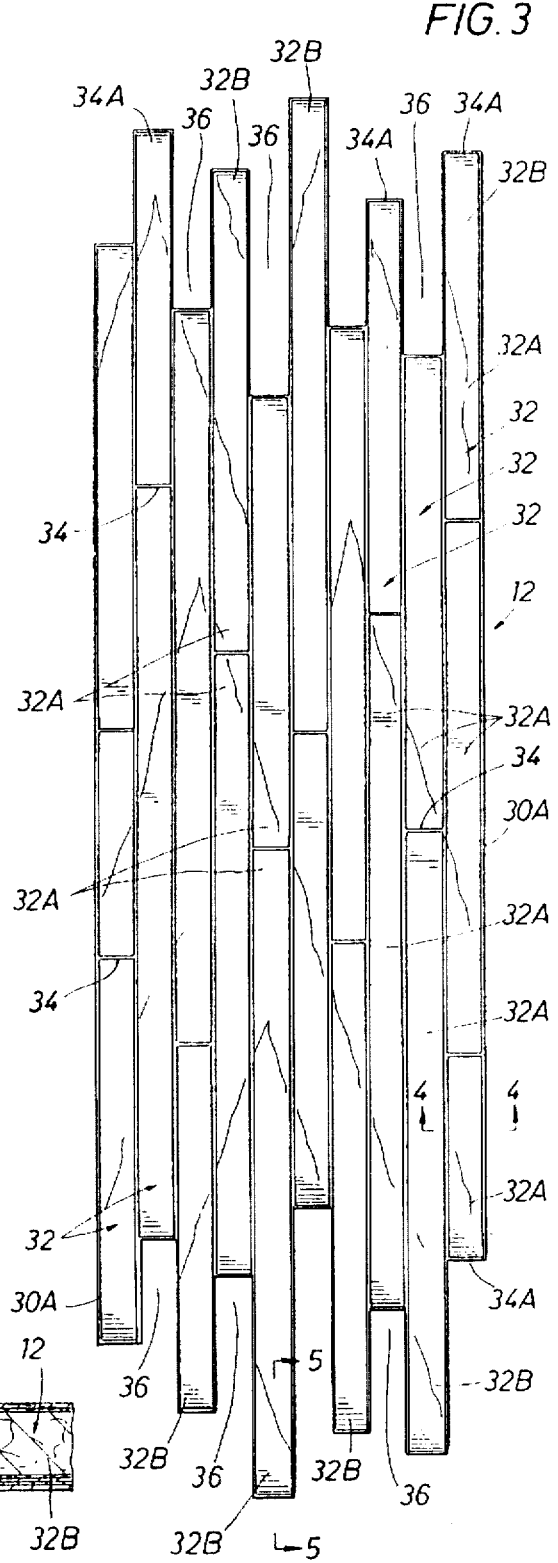
FIG.3

VENEER PANELS AND METHOD OF MAKING

This application is a continuation of application Ser. No. 08/559,829 filed Nov. 17, 1995 ABD.

FIELD OF THE INVENTION

This invention relates to veneer panels and method for making, and more particularly to interfitting veneer panels and the method of making interfitting mating veneer panels.

BACKGROUND OF THE INVENTION

Heretofore, generally rectangular panels have been utilized as floor panels or wall panels and have been positioned in adjacent relation to each other to form a continuous floor or wall. Rectangular plywood panels or sheets containing various layers of material have been utilized heretofore with decorative wood veneer. However, the rectangular panels have been positioned in adjacent relation to each other to form the wall or floor surface and the panels have usually been cut to fit a required area.

The panels, particularly when provided with an outer wood veneer, may have a predetermined design with adjacent panels having a matching or continuous design as desired. It is desirable that adjacent panels interfit so that the separated panels or joints between the panels are not visually detected easily. Such an intermitting panel is particularly desirable where the effect of the wood grain provides the decorative surface such as might be desirable for flooring. Some panels, particularly for flooring, are designed to provide the appearance of a plurality of narrow wooden boards in an interfitting side by side relation to each other. Many wooden floors, particularly hardwood floors, are formed from a plurality of wooden boards having interfitting tongue and groove joints and present a pleasing appearance.

SUMMARY OF THE INVENTION

The present invention is directed to veneer panels which are designed to interfit with each other without seams or joints between the panels being easily detected visually thereby to simulate a plurality of wooden planks or the like in staggered end to end relation. Each of the interfitting panels is formed from a generally rectangular panel blank which includes an intermediate base layer having an outer veneer layer thereon. A veneer normally comprises a wood of finer quality than the base layer to provide an attractive appearance and is normally glued over the base or core layer. As the veneer is more costly, it comprises a relatively thin outer layer over a relatively thick base layer. It is desirable that the outer veneer present a high quality appearance, preferably of a decorative nature. A decorative design in the outer veneer can be easily achieved by computerized routing machines which, such as a CNC router sold under the name "Protec" by Biesse America of Charlotte, N.C. A router or routing tool easily makes grooves in a variety of predetermined patterns as may be provided by a programmed computer for the router. The outer veneer layer is relatively thin, such as 1/16 inch in thickness, and the decorative design is provided by grooves cut in the veneer by the router. The router machine is programmed by the associated computer for the predetermined design.

At least one end of the veneer panel is cut to form an end portion for interfitting or mating with a complementary end portion on an adjacent panel in end to end relation. Each panel normally has its veneer layer grooved with a plurality of longitudinally extending generally parallel grooves to define a plurality of adjacent parallel rows in the veneer layer in side by side relation. Transverse grooves in the veneer layer extend between the adjacent grooves to divide each row in a plurality of longitudinal sections in end to end relation. It is desirable that transverse grooves in adjacent rows be staggered to provide a visual appearance of individual narrow wooden boards or panels laid end to end to simulate a hardwood floor, for example. To maintain the appearance of a hardwood floor without a transverse seam or joint extending across the entire width of a panel, the interfitting panel end is cut across its entire thickness to form a plurality of staggered end portions corresponding to the longitudinal rows in the veneer. Thus, the longitudinally extending veneer rows and corresponding panel end portions extend at varying lengths from the panel end to define slotted spaces adjacent the projecting panel end portions of varying lengths.

A planar wall or floor normally includes a plurality of interfitting or mating panels. Grooves are provided in adjacent mating edges of adjacent panels. The mating edges of each panel are formed with a half groove which mates with a half groove on the adjacent panel to define a full groove similar to the remaining grooves in the panels. Intermediate veneer panels are formed with a half groove about the entire periphery of the panel for mating with complementary half grooves on adjacent panels. Thus, the connecting joints between adjacent panels are formed of a complete groove similar to the remaining grooves and are not easily detected visually.

Complementary projecting end portions are provided on at least one end of an adjacent panel and the projecting end portions on adjacent panels interfit to form a smooth staggered joint which presents the appearance of a continuous wall or floor without unsightly connecting seams or joints. The connecting joint defines a plurality of staggered transverse end grooves extending across the entire width of the panels thereby to form a connecting joint between adjacent panels that is not easily detected visually and is similar in appearance to a hardwood floor, for example, when the panels are utilized as flooring.

Other advantages and features of this invention will be apparent from the following drawings and specification.

BRIEF DESCRIPTION OF THE DRAWINGS

FIG. 1 is a top plan of a wall covering comprising interfitting veneer panels of the present invention and showing staggered projecting end portions on interfitting adjacent panels;

FIG. 2 is an enlarged section taken generally along line 2—2 of FIG. 1 showing half grooves along the opposed side of a projecting end portion for mating with complementary end portions on adjacent panels;

FIG. 3 is an enlarged plan of an interfitting veneer panel shown in FIG. 1;

DESCRIPTION OF THE INVENTION

Figure 4:
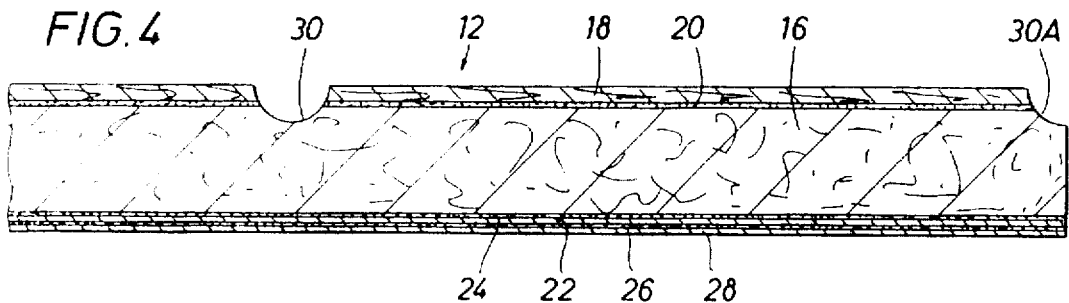
FIG. 4 is a sectional view taken along line 4—4 of FIG. 3 and illustrating grooves in the veneer layer.
Figure 5:
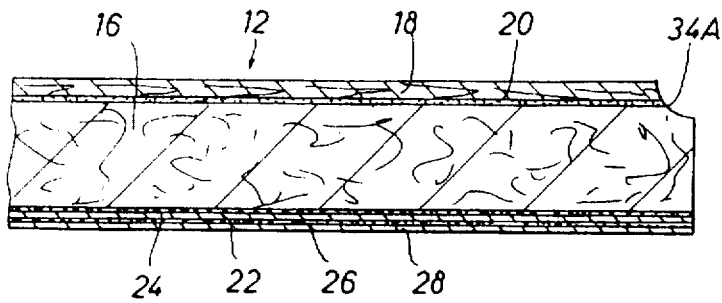
FIG. 5 is a sectional view taken along line 5—5 of FIG. 3 and illustrating a half groove at the end of the veneer panel of the present invention.

Referring now to the drawings for a better understanding of this invention and more particularly the embodiment shown in FIGS. 1–6, a portion of a completed wall covering utilizing veneer panels of the present invention is shown particularly in FIG. 1. The veneer panels of this invention are normally glued to a planar wall surface, particularly a bottom wall surface or a side wall surface formed from various construction materials, such as concrete, steel, wood or plastic, for example. The term "wall" as used in the specification and claims herein shall be interpreted as including a side wall, an end wall, a top wall forming a ceiling, or a bottom wall forming a floor, deck or platform.

FIG. 1 shows a pair of end veneer panels 10 and intermediate veneer panels 12 arranged in an interfitting or mating relation with each other. An intermediate veneer panel 12 is shown in detail in FIGS. 3–6. It is to be understood that the remaining veneer panels 10, 12 are formed in a manner similar to the veneer panel shown in FIG. 2 except that end panels 12 have one end formed of a straight or planar end edge for fitting against an end of the covered wall surface. Veneer panel 12 is formed from a rectangular blank and includes a plurality of layers as shown particularly in FIG. 4–6 including abase or core layer 16 preferably formed of a pressed board or fiberboard material of wood fibers which may include a resin. An outer veneer layer 18 is secured by a suitable adhesive 20 to base or core layer 16. Veneer layer 18 is preferably formed of a wood veneer material between around 1/64 inch and 1/8 inch in thickness. Veneer 18 is preferably formed of a natural wood veneer or may be formed also of recomposed wood. A suitable material for base layer 16 is a medium density fiberboard sold under the trade name "Medite FR" by Medite Corporation of N. Mex., Las Vegas, N. Mex. Another suitable material for base or core layer 16 is sold under the name "Duron" by Wood Fiber Industries of the Masonite Corporation, Chicago, Ill. A glue material that has been found to be satisfactory for glue layer 20 is designated as "Casco Resin 583" sold by Borden Packaging and Industrial Products, a division of Borden, Inc., Bellevue, Wash.

A backing sheet or layer 22 is adhesively secured by a glue layer 24 to the lower or bottom surface of core layer 16. Backing layer 22 may comprise, for example, a resin impregnated paper, a plastic material, or a wood fiber material. A backing sheet 22 which has been found to be satisfactory is sold under the mark "Gator*Ply" by International Paper Company, Statesville, N.C. Glue layer 24 is similar to glue layer 20 and formed of the same type of material. A bottom peelaway protective paper or plastic sheet 28 is secured by a pressure sensitive adhesive 26 to backing sheet 22. In some instances, it may be desirable to delete plastic sheet 28 and adhesive layer 26 from veneer panel 12.

If desired, a protective coating may be used as a covering for veneer layer 18 such as a polyurethane, or epoxy type clear coating for protection of the surface of veneer layer 18. The protective outer layer may be applied to the veneer panels before the panels are positioned on the wall surface or may be applied after the panels are positioned on the wall surface. As a specific but non-limiting example of a suitable veneer panel 12, intermediate base layer 16 may be formed of a thickness of ¼ inch in thickness with veneer layer 18 being of a thickness of 1/16 inch and glue layers 20 and 24 of a thickness of around 5 mils (0.005 inch) in thickness. Veneer layer 18 is formed of a fine sliced wood veneer having a distinctive grain therein with a continuous grain pattern. For best results, base layer 16 has a thickness normally at least around three times the thickness of veneer layer 18.

Panel 12 as shown particularly in FIG. 3 has a plurality of longitudinally extending parallel grooves 30 extending in parallel relation to each other to define a plurality of rows 32 therebetween. Grooves 30 are of a semicircular shape in cross section and preferably extend through veneer layer 18 into base layer 16 as shown in FIG. 4. However, for some panel designs or patterns, it may be desirable that grooves 30 not extend into base layer 16. The side edges of veneer panel 12 are adapted to interfit with adjacent panels 12 with a groove therebetween similar to grooves 30 so that a joint between adjacent panels is not easily visually detected. For that reason, each side edge is formed of a half groove 30A as shown particularly in FIG. 4. Thus, when two panels 12 are positioned in side by side relation, half grooves 30A on adjacent panels 12 form a completed semicircular groove 30 and present an appearance similar to the remaining grooves 30. Transverse grooves 34 extend between longitudinal grooves 30 and are staggered to simulate a plurality of separate wood boards or the like. Any desired pattern or transverse grooves 34 may be provided with grooves 34 similar to grooves 30. The width or diameter of grooves 30 and 34 is preferably around ⅛ inch. Widths between 1/16 inch and ⅜ inch would function in a satisfactory manner. A half groove 30A would have a width ½ the width of groove 30. Each row 32 is separated by transverse grooves 34 into a plurality of row sections 32A thereby to simulate a plurality of narrow boards or panels laid end to end. Rows 32 form projecting end portions 32B adjacent each end of veneer panel 12. Slotted areas 36 are formed between projecting end portions 32B which are adapted to receive interfitting end portions 34 on adjacent veneer panels. As shown particularly in FIG. 5, the end of each row 32 has a half groove 34A thereon for mating with a complementary half groove 34A to form a completed groove 34 similar to remaining grooves 34. Thus, the entire outer periphery of veneer panel 12 is formed with half grooves for mating with complementary half grooves on adjacent veneer panels.

To apply panels 10 and 12 to a wall surface in a predetermined pattern for mating in intermitting relation with each other, the protective paper layer 28 on the lower surface of each of the panels 10, 12 is peeled off to expose the pressure sensitive adhesive 26. Then, the panel is applied to the desired wall surface with pressure sensitive adhesive 26 mounting the panel in a desired relation. Normally, end panels 10 would first be applied and then intermediate panels 12 would be applied in interfitting relation to end panels 10 and with each other. The half grooves 30A and 34A about the entire outer periphery of intermediate panels 32 mate with complementary half grooves on adjacent veneer panels to provide completed grooves 30 and 34 which are similar to the remaining grooves 30 and 34 thereby to present a continuing pattern so that a joint or connection between adjacent panels is not visually detectable at least to a casual observer or viewer. While half grooves have been illustrated about the outer periphery of the veneer panels 12, it is understood that mating groove portions less or more than ½ groove size could be provided. For example, a ¼ groove may be provided on one panel and a mating ¾ groove on an adjacent panel. In some instances it may be desirable to provide a full groove on a peripheral portion of one panel and no groove on the mating peripheral portion of an adjacent panel. While FIG. 1 shows bold lines outlining panels 12, it is to be understood that the grooves forming the perimeter of panels 12 are similar to the remaining grooves and are not normally visually detected.

The present invention thus is directed particularly to a veneer panel and method which eliminates such a continuous joint or connection between adjacent veneer panels. For forming the desired pattern of grooves in outer veneer layer 18, a CNC router is utilized for making the grooves in a predetermined design or pattern as provided by a programmed computer. A suitable CNC router as previously indicated is sold under the name "Protec" by Biesse America of Charlotte, N.C. A rectangular veneer blank of a width of four (4) feet and a length of eight (8) or ten (10) feet is first placed on the routing machine and held in place thereon by suitable suction devices applied against the lower surface of the rectangular veneer blank. If desired, the rectangular sheets of a width of four (4) feet may be first cut into two panels of two (2) feet in width for ease in handling. A plurality of movable cutting heads on the router move along the length of the veneer panel to cut the plurality of parallel grooves 30 in outer veneer layer 18 to form rows 32. Then, the cutters move in a pattern to form transverse grooves 34 in the outer veneer layer 18 to form row sections 32A. Next, the rectangular panel is cut across the entire width at each end to form the staggered projecting end portions 32B and the intervening slots 36 formed between the projecting end portions 32B. Then, the entire outer periphery of panel 12 is cut by the routes to form half grooves 30A and 34A. Panel 12 after being cut and grooved by the router is now in condition for application to the wall surface.

Figure 6:
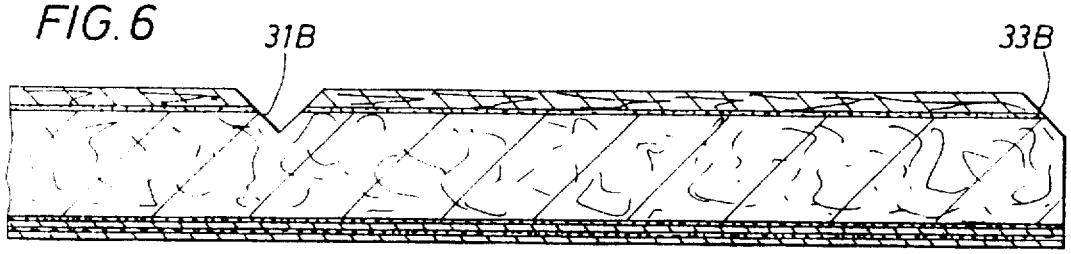
FIG. 6 is a sectional view of a modified groove.
Figure 7:
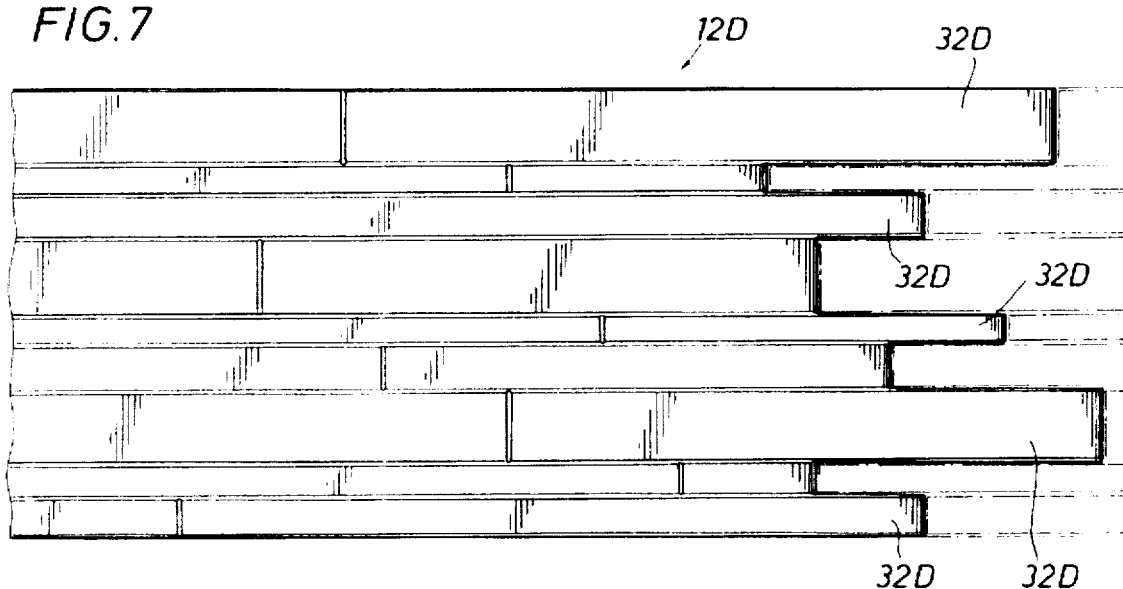
FIG. 7 is a top plan view of an end portion of a modified veneer panel illustrating veneer rows of different width.
Figure 8:
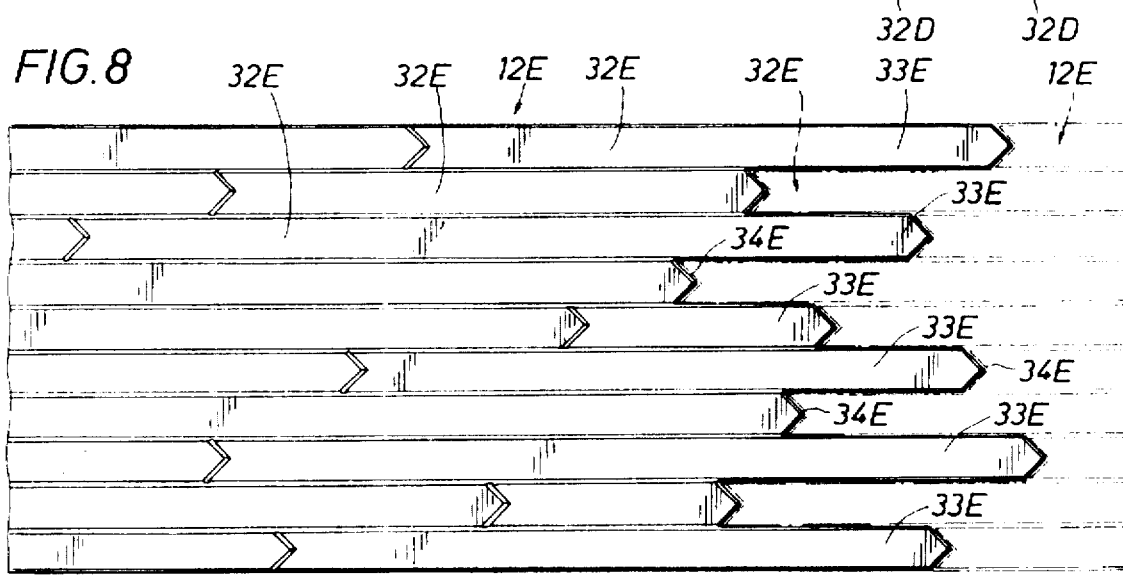
FIG. 8 is a top plan view of an end portion of another modified veneer panel illustrating projecting end portions having V-shaped ends.

While groove 30 has been illustrated as a semicircular or arcuate groove, it is to be understood that groove 30 may be formed of various cross sectional shapes, such as a V-shaped groove 31B and half groove 33B as shown in FIG. 6. Channel shaped grooves and V-shaped grooves may also be desirable. Further, while rows 32 have been illustrated in the drawings as being of the same width, it is to be understood that rows 32 may be of varying widths as may be desired. Referring to FIG. 7, a modified panel 12D includes a plurality of rows 32D which are of varying widths. Adjacent interfitting panels 12D interfit with each other in the manner as set forth in the embodiment of FIGS. 1-5. A further modification is shown in FIG. 8 in which panel 12E has a plurality of rows 32E with transverse grooves 34E formed of a generally V-shape as viewed in plan. End portions 33E also have V-shaped ends as shown in plan at 35E and are adapted to interfit with complementary notches in an adjacent panel as shown in FIG. 7. Panels 12E interfit with adjacent panels as in the embodiment set forth in FIGS. 1-6.

Figure 9:
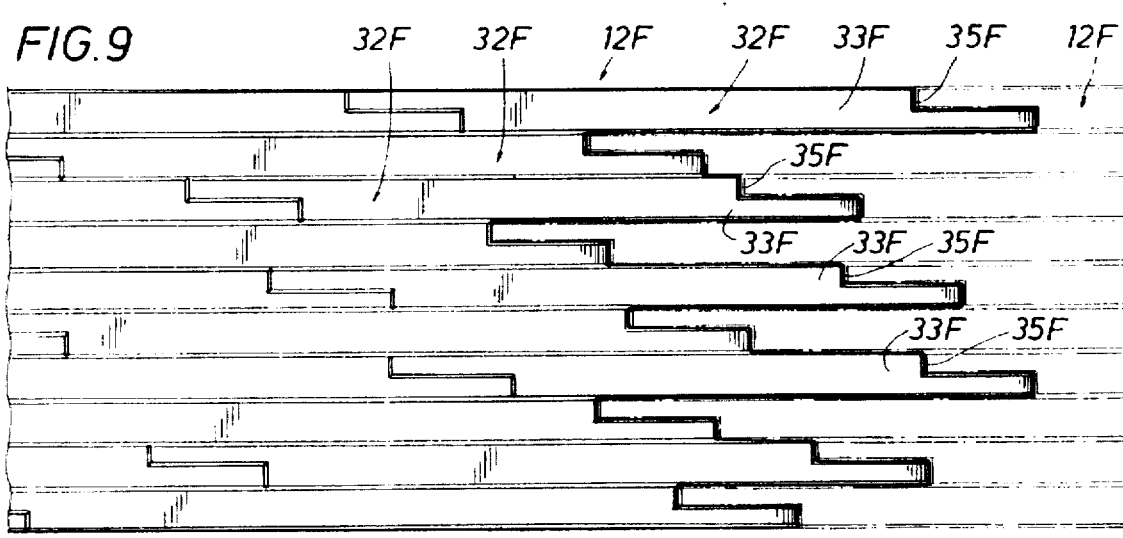
FIG. 9 is a top plan view of an end portion of a further modification of the veneer panel in which the projecting end portions are slotted.

An additional modification is shown in FIG. 9 by panel 12F in which the end portions 33F for each row 32F are notched at 35F. An interfitting complementary veneer panel interfits panel 12F as shown in broken lines in a manner similar to the embodiment of FIGS. 1-5. Half grooves are formed about the entire outer periphery of the embodiments shown in FIGS. 7-9 for mating with half grooves on adjacent complementary veneer panels as in the embodiment of FIGS. 1-5.

Referring now to the embodiments shown in FIGS. 10-13, a design or pattern is illustrated in which inserts are positioned in cutouts of the veneer panels. The inserts may, for example, be of varying colors or have an unusual design thereon. The modified veneer panels have interfitting end portions as in the embodiments of FIGS. 1-8.

Figure 11:
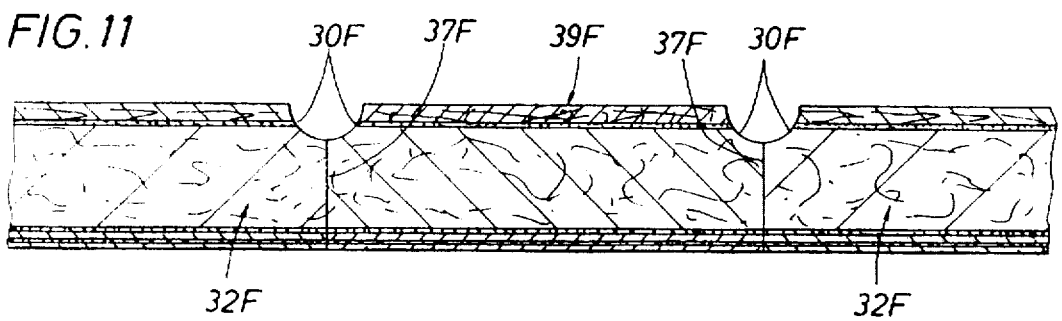
FIG. 11 is a sectional view along line 11—11 of FIG. 10.
Figure 10:
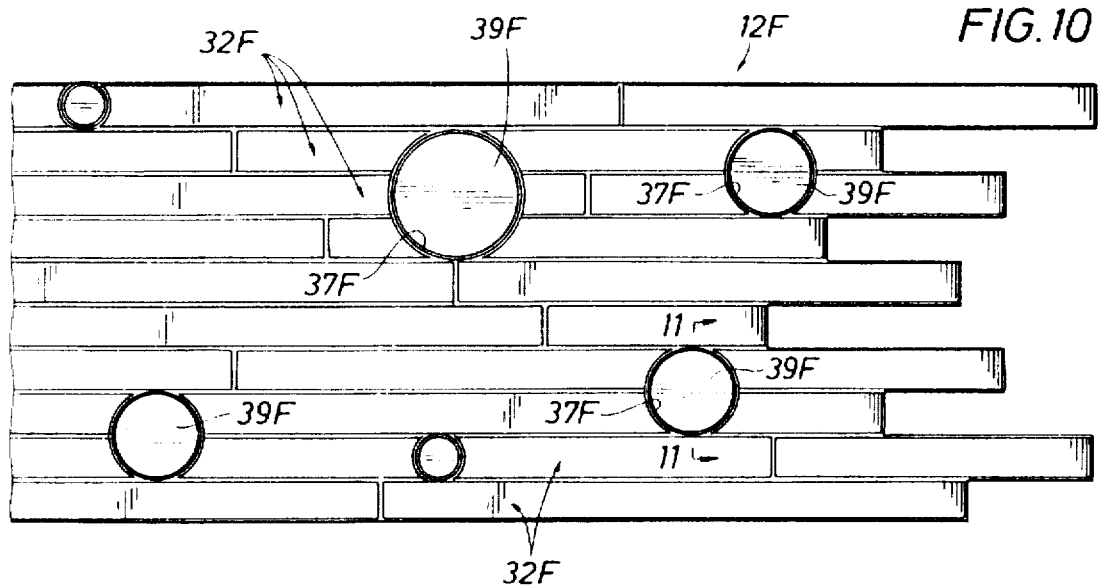
FIG. 10 is atop plan view of an end portion of another modification of the veneer panel in which circular inserts are positioned in the veneer panel.

Referring first to the embodiment of FIGS. 10 and 11, a veneer panel 12F is shown having a plurality of longitudinally extending rows 32F. Veneer panel 12F has a plurality of circular cutout portions 37F of varying diameters extending through panel 12F. Mounted within each circular portion 37F is a circular insert generally indicated at 39F. Inserts 39F have a half groove 30F in the veneer layer which extends about the entire outer periphery of the inserts. The cutout portions 37F on veneer panel 12F are also formed with a complementary half groove 30F. Inserts 39F may have a predetermined color different from the color of the adjacent veneer layer of veneer panel 12F. While cutout portions 37F have been illustrated as extending through the entire thickness of veneer panel 12F, it may be desirable to provide cutouts in only the outer veneer layer with the inserts being of generally the same thickness as the veneer layer and supported on the base layer.

Figure 12:
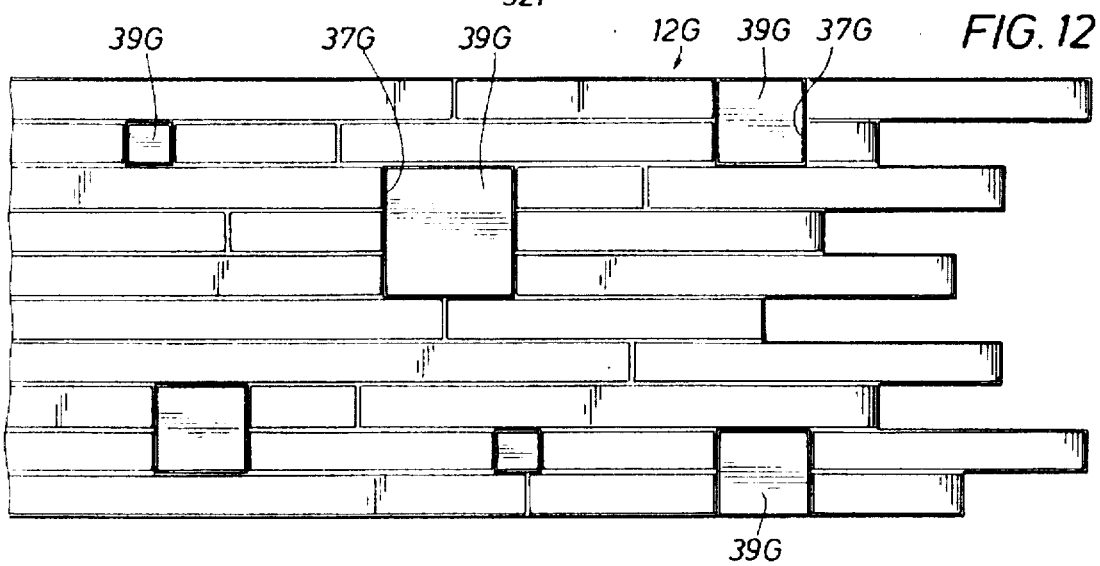
FIG. 12 is a top plan view of an end portion of a further modification of the veneer panel in which square inserts are positioned in the veneer panel.
Figure 13:
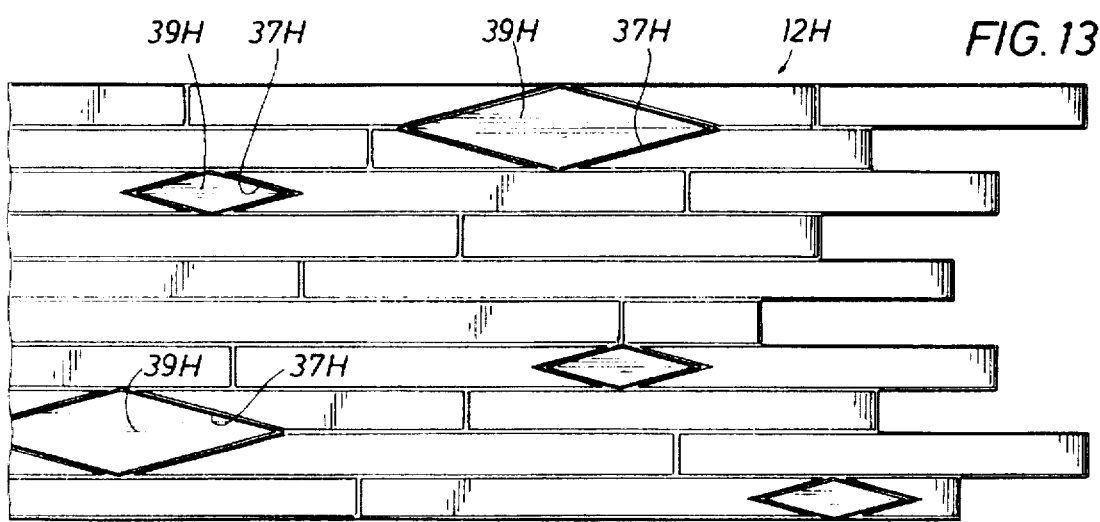
FIG. 13 is a top plan view of an end portion of an additional modification of the veneer panel in which diamond shaped inserts are positioned in the veneer panel.

A further embodiment of a veneer panel with inserts is shown in FIG. 12 in which a veneer panel 12G has rectangular inserts 39G of varying sizes mounted in cutout portions 37G of panel 12G in a manner similar to the embodiment shown in FIGS. 10 and 11. Another embodiment of a veneer panel with inserts is shown in FIG. 13 in which a veneer panel 12H has a plurality of diamond shaped inserts 39H of varying sizes mounted in cutout portions 37H of panel 12H.

Figure 14:
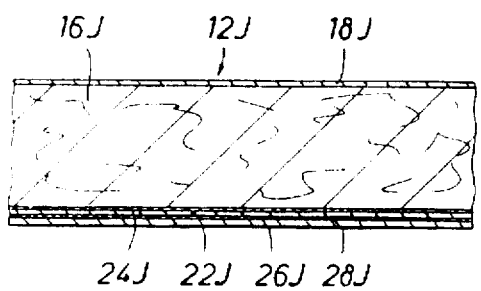
FIG. 14 is an enlarged sectional view of a modified veneer panel in which a resin impregnated overlay sheet forms the outer veneer layer.

Referring now to FIG. 14, another embodiment of the invention is illustrated in which a resin impregnated overlay sheet of a decorative pattern generally indicated at 18J is positioned over the core layer 16J formed of fiberboard or plywood and forms the outer veneer for panel 12J. Backing sheet 22J, glue layer 24J, peelaway sheet 28J and pressure sensitive adhesive 26J are similar to the corresponding layers in the embodiment shown on FIGS. 1-6. The overlay sheet 18J forming the veneer layer with the predetermined decorative pattern thereon which may include lines simulating rows is pressed on the upper surface of core layer 16J at a predetermined pressure, over around 50 psi, for example, and a predetermined temperature of over around 100° C. for example. In some instances it may be desirable to utilize a cold press operation. The resin impregnated sheet 18J may be provided with lines to simulate grooves and wood grain on the outer surface. Thus, a wood veneer may be simulated visually by resin impregnated sheet 18J. A resin which has been found to be satisfactory is a melamine resin which is a type of amino resin made from melamine and formaldehyde. Melamine resins are generally water and heat resistant and provide a hard wear resistant surface. Other types of impregnated sheet may be utilized, such as a vinyl impregnated or acrylic impregnated sheet. Sheet 18J has a thickness about 0.001 inch to 0.010 inch. An adhesive may be utilized with sheet 18J but a measurable adhesive layer is not normally obtained when a resin type impregnated material is utilized as the veneer layer since any adhesive would normally be absorbed within layer 16J.

Figure 15:
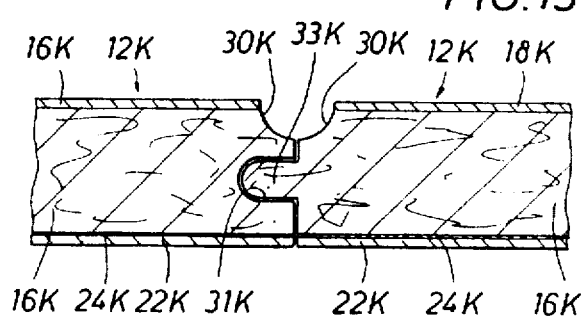
FIG. 15 is an enlarged sectional view of a further modification in which a pair of adjacent veneer panels are connected to each other with a tongue and groove connection.

Referring now to FIG. 15, another embodiment is illustrated which shows a tongue and groove connection between adjacent panels 12K. A side groove 31K is provided in one panel 12K and an interfitting side tongue 33K on the other panel 12K is received within groove 31K. An outer resin impregnated sheet 18K forms the outer veneer layer. If desired, such a tongue and groove arrangement may be provided about the entire periphery of panels 12K and could also be utilized by the other embodiments of this invention. When interfitting tongue and groove arrangements are utilized, an adhesive on the lower surface of the panels is not used as it is necessary to move the panels laterally along the supporting wall surface when connecting adjacent panels. Thus a backing layer 22K similar to backing layer 22 of the embodiment of FIGS. 1–6 is utilized as the bottom surface and is adhered to core layer 16K by adhesive layer 24K. A resin impregnated outer layer 18J is secured to core layer 16J. Half grooves 30K are arranged on adjacent panels 12K to form the longitudinal and transverse grooves for panels 12K. An adhesive material, such as a mastic material, is normally placed on the supporting wall surface prior to the installation of panels 12K.

Each panel 12K has a pair of parallel side edges and end edges connecting the side edges about the outer periphery of the staggered end portions. For interfitting adjacent panels 12K, a tongue 33K would normally be provided on one side edge and one end edge with a groove 31K on the remaining side edge and end edge.

From the above, it is apparent that improved veneer panels have been provided by the present invention for providing a wall covering including a plurality of interfitting veneer panels having a continuing pattern so that joints or seams between adjacent veneer panels are not visually detectable at least to a casual observer or viewer. The connecting joints between adjacent panels define grooves which are similar to other grooves in the panels to form a continuous pattern. A variety of patterns may be provided by a CNC routing machine which may be programmed by an associated computer for a variety of predetermined designs.

While preferred embodiments of the present invention have been illustrated in detail, it is apparent that modifications and adaptations of the preferred embodiments will occur to those skilled in the art. However, it is to be expressly understood that such modifications and adaptations are in the spirit and scope of the present invention as set forth in the following claims.

What is claimed is:

1. A floor surface formed from a plurality of integral one piece interfitting veneer panels; each of said panels formed from a one piece rectangular panel blank and comprising:

a base layer formed of a fibrous wood material;

an outer thin veneer layer secured to said base layer and having a plurality of parallel longitudinally extending grooves therein forming longitudinally extending rows; said veneer rows projecting from opposed ends of said panel to form staggered end portions, said panel ends each being cut along its entire thickness to form said staggered end portions of said veneer rows with the length of each end portion being substantially different from the lengths of adjoining end portions to form slots between alternate end portions; said thin veneer layer comprising an outer resin impregnated sheet secured to said base layer; and said staggered end portions of each panel being interfitted with staggered end portions of adjacent panels in end to end relation.

2. A floor surface as set forth in claim 1 wherein:

each of said panels has an outer peripheral edge about its outer periphery, and at least a partial groove is formed in said veneer layer of said outer peripheral edge about the entire outer periphery of said panel.

3. A floor surface as set forth in claim 1 wherein:

each of said panels has an outer peripheral edge about its outer periphery;

a groove is formed in said base layer about around one half of said outer peripheral edge; and a tongue is formed in said base layer about the remaining half of said outer peripheral edge.

4. A method of forming a veneer panel for a wall comprising the steps of:

providing a rectangular blank formed of a fibrous material for a base layer of said panel;

mounting a resin impregnated sheet over said base layer having a plurality of longitudinal parallel lines to simulate a plurality of parallel adjoining rows of wooden planks; and cutting at least one end of said rectangular blank including said sheet across the entire thickness to form a staggered end portion for each simulated row with the length of each end portion being substantially different from the lengths of adjoining end portions to form slots between alternate end portions for varying the length of the simulated rows.

5. The method of claim 4 including the step of:

forming the outer surface of said resin impregnated sheet with a simulated wood grain for simulating a wood veneer on said base layer.

6. The method of claim 5 including the step of:

pressing said resin impregnated sheet onto said base layer at a predetermined pressure and a predetermined temperature.

7. A method of forming a floor covering of a plurality of interfitting veneer panels comprising the steps of:

providing a plurality of rectangular blanks formed of a fibrous wood material for said panels;

mounting a resin impregnated sheet over each blank having a plurality of longitudinally extending parallel lines to simulate a plurality of parallel adjoining rows of wooden planks;

cutting at least one end of each rectangular blank including said sheet across its entire thickness to form a staggered end portion for each of said simulated rows with the length of each end portion being substantially different from the lengths of adjoining end portions to form slots between alternate end portions for varying the lengths of the simulated rows; and positioning said panels in an interfitting relation with end portions of adjacent panels mating and interfitting to form continuous simulated rows for the floor covering.

8. The method of claim 7 including the step of:

pressing said resin impregnated sheet of each panel onto its associated blank at a predetermined pressure and a predetermined temperature.

9. A method of forming a veneer panel for a wall comprising the steps of:

providing a rectangular blank formed of fibrous wood material for a base layer of said panel;

mounting an outer thin veneer layer over said base layer;

forming said outer thin veneer layer with a plurality of longitudinal parallel grooves to simulate a plurality of parallel adjoining rows of wooden planks in said veneer layer; and cutting at least one end of said rectangular blank including said veneer layer across the width and the entire thickness of said blank to form a staggered end portion for each simulated row with the length of each end portion being substantially different from the lengths of adjoining end portions to form slots between alternate end portions for varying the length of the simulated rows.

10. A method of forming a veneer panel for a wall as set forth in claim 9 including the steps of:

cutting both ends of said rectangular blank across their entire thickness to form staggered end portions for said veneer rows for mating with complementary end portions on adjacent veneer panels; and grooving said veneer layer of said rectangular veneer blank to form a plurality of transverse grooves in the veneer layer connecting adjacent pairs of said longitudinal veneer grooves to form each row of a plurality of veneer sections positioned end to end.

11. A method of forming a veneer panel for a wall as set forth in claim 9 including the step of:

forming groove portions on the exposed ends and sides of said staggered end portions for mating with complementary groove portions on end portions of an adjacent veneer panel.

12. A method of forming a veneer panel as set forth in claim 9 including the step of:

forming groove portions in said veneer layer on opposed parallel side edges of said veneer panel for mating with complementary groove portions on adjacent veneer panels.

13. A method of forming a veneer panel as set forth in claim 12 including the step of:

forming notched sections in said staggered end portions of said veneer rows extending longitudinally along the entire thickness of said panel.

14. A method of forming a veneer panel as set forth in claim 9 including the steps of:

providing cutout portions in said veneer layer; and positioning inserts within said cutout portions of a predetermined design.

15. A method of forming a veneer panel as set forth in claim 14 including the steps of:

providing circular cutout portions in said veneer layer; and positioning circular inserts within said cutout portions.

16. A method of forming a wall covering of a plurality of one piece interfitting veneer panels comprising the steps of:

providing a plurality of one piece rectangular blanks formed of fibrous wood material for said panels;

mounting an outer thin veneer layer over each blank;

forming each thin veneer layer with a plurality of longitudinally extending simulated wooden planks to simulate a plurality of parallel adjoining rows of wooden planks in said veneer layer;

cutting the opposed ends of each rectangular blank including said veneer layer across its width and entire thickness to form staggered end portions for both ends of each of said simulated rows with the length of each end portion being substantially different from the lengths of adjoining end portions to form slots between alternate end portions for varying the lengths of the simulated rows; and positioning said panels in an interfitting relation with end portions of adjacent panels mating and interfitting to form continuous simulated rows for the wall covering.

17. A method as set forth in claim 16 including the step of grooving each thin veneer layer with a router to form said simulated wooden planks.

18. A method as set forth in claim 16 including the step of mounting a resin impregnated sheet having a plurality of longitudinal parallel lines over each blank to form said thin veneer layer with said simulated wooden planks thereon.

* * * * *